Jan. 16, 1968  R. L. LA BARGE  3,363,383
JOINT STRUCTURES
Filed March 8, 1965  4 Sheets-Sheet 1

INVENTOR.
ROBERT L. LA BARGE
BY
*S. Earnest Low*
ATTORNEY

Jan. 16, 1968    R. L. LA BARGE    3,363,383
JOINT STRUCTURES

Filed March 8, 1965    4 Sheets-Sheet 2

INVENTOR.
ROBERT L. LA BARGE
BY S. Ernest Low
ATTORNEY

Jan. 16, 1968 R. L. LA BARGE 3,363,383
JOINT STRUCTURES
Filed March 8, 1965 4 Sheets-Sheet 4

INVENTOR.
ROBERT L. LA BARGE
BY
S. Ernest Low
ATTORNEY

United States Patent Office 3,363,383
Patented Jan. 16, 1968

3,363,383
JOINT STRUCTURES
Robert L. La Barge, Murrysville, Pa., assignor to Aluminum Company of America, Pittsburgh, Pa., a corporation of Pennsylvania
Filed Mar. 8, 1965, Ser. No. 437,808
11 Claims. (Cl. 52—471)

ABSTRACT OF THE DISCLOSURE

A joint structure between two or more substantially rigid structural members is described hereinafter in combination with, and as an element of, a configurated elastomeric compressibly resilient and transformable joint element in elongate strip form compressibly and transformably installable within a re-entrant recess formed by configurated marginal edge portions of the substantially rigid structural members to provide sealed and secured coupling relationship of the joint structure.

---

This invention is generally addressed to joint structures incorporating a resilient compressible flexible and extensible element as an essential component thereof. It is more specifically concerned with elastomeric elements adapted in use for joining practices between two or more substantially rigid structural members to provide resiliently secured and sealed connection therebetween.

Of specific concern is the provision of an elastomeric joint securing and sealing element, which not only serves to securely maintain jointure between, but is also resiliently and flexibly adjustable to non-alignment, allowable and experienced dimensional tolerances and discrepancies, and/or relative movement between the substantially rigid members incorporated in joint structures falling within the scope of the invention.

Basically representative of joining practices falling within the scope of the invention are joints between the marginal edges of adjacent substantially rigid metallic sheathing and/or module panel components regularly employed in the erection and construction of walls, roofs, floors and decks of buildings, and similar enclosing structures, including truck bodies, trailers, and the like. Of further particular significance in this regard is the use of joints of the invention in the construction and provision of enclosed refrigerated areas, such as freezer warehouses and refrigerated truck bodies, freezer room and compartments within existing buildings, as well as in the construction of housing and similar units for tropical and/or low temperature climatic zones, where moderate and/or extreme temperature differentials can prevail. The joints in such structures must of necessity not only accommodate relative movement between the substantially rigid members thereof in response of differential temperature conditions, but must also provide a sealed environment and impart impermeability to the joints against atmospheric, gaseous, vapor and/or moisture passage therethrough.

Substantially rigid laminated sandwich type module panels are experiencing wide acceptance in the building and construction field, as assembled units and components thereof, in that they exhibit exceptionally good insulative properties and are being commercially fabricated and made available in conventional lumber sizes responding to conventional erection methods and tools. Exemplary of laminated building products herein referred to are expanded sandwich type components in the form of module panels having exposed sheathing or liners laminated or secured to opposite major surface areas of cellular honeycomb and/or foamed polymeric organic core materials in which at least one of the exposed liners is preferably selected in the form of substantially rigid metallic sheathing. In this connection, the liner constituting the major surface area of the sandwich type module panel component, and preferably the liner remote to weather exposure and similar variable conditions, may if desired be selected from a non-metallic material, such as hard board, or the like.

In resent months, insulated module panels comprising aluminum and aluminum alloy liner sheets coextensively adhered to opposite major surface areas of expanded polystyrene planks or cores, in sizes approximating five feet by sixteen feet, have found ready acceptance for enclosing refrigerated areas, such as freezer warehouses and freezer rooms in entirety, refrigerated compartments within existing buildings, and in the construction of buildings and enclosed units for tropical and/or low temperature climatic zones, where at least one of the opposite major surface areas of the panels between which joints are essential, is exposed or subjected to extreme temperature differentials. Such installations have required joining and/or coupling of adjacent marginal edges of the module panels employed in their construction and erection, and the elastomeric element of the invention, as a component part of the joint structures, has insured resiliently secured and sealed connections characterized by permissible relative movement of the module panel members transversely across the marginal edge joints therebetween, as well as accommodating appreciable nonalignment and dimensional discrepancies between the several components constituting the joint structures.

From the above description, it will be appreciated that a primary object of the invention contemplates the provision of a joint structure between substantially rigid structural members, an essential component or element of which comprises an elastomeric element capable of securing and sealing the joint structures.

Another object of the invention is to provide a flexibly resilient and compressibly transformable joint sealing and securing element in strip form capable of interlocking incorporation in a joint structure between the marginal edges of substantially rigid elements of adjacent module panels subject to relative movement across the joint therebetween.

Other objects and advantages will become apparent to those versed in the art to which the invention appertains on consideration of the following description of the invention, taken in conjunction with the following drawings, in which.

In general, and structurally common to the several embodiments of joint structures illustrated in the above-identified views, the invention essentially comprises the provision of an elastomeric element for incorporation and completion of a joint between substantially rigid structural members in adjacent edge disposition, with the chief function of the elastomeric element being to secure and seal the joint structures so formed. It will be further observed from the aforesaid joint illustrations that the substantially rigid members incorporated therein may be assembled in interengaging relationship between at least two substantially rigid members thereof; be intentionally separated or spaced in respect to the joint structure therebeween; and, if desired, incorporate the previously stated interengaging relationship between at least two of the substantially rigid members on either side of an otherwise intentionally separated joint structure. Regardless of the specific details of the joint structures of the invention, it is a characteristic thereof that the elastomeric element common thereto permits of relative movement, non-alignment, and/or dimensional discrepancies in respect to the substantially rigid members to be joined, while constituting a joint securing and sealing element therefor.

Figure 1:
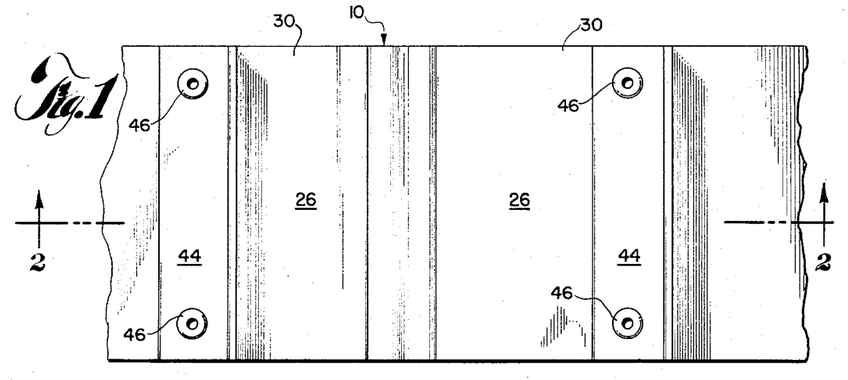
FIG. 1 is a front elevational or plan view of a pair of adjacent module panels incorporating one embodiment of joint structure falling within the concept of the invention.
Figure 2:
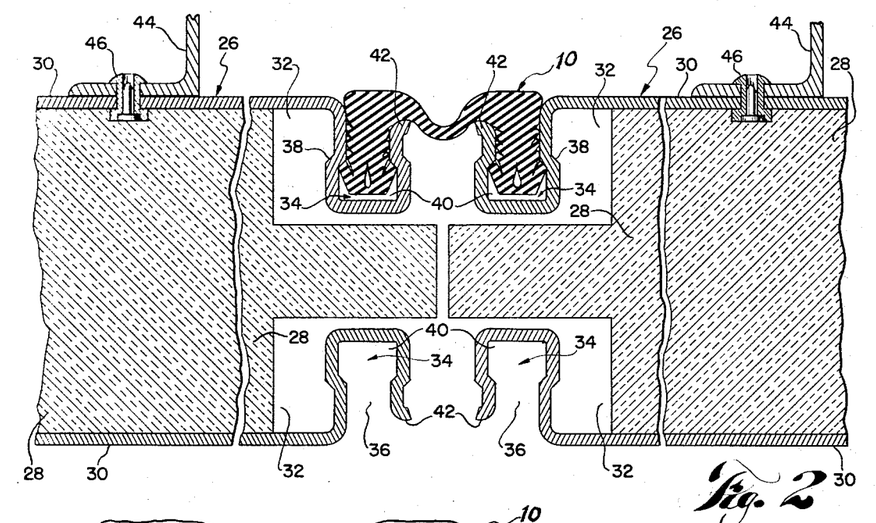
FIG. 2 is a fragmentary sectional elevation taken on the plane 2—2 of FIG. 1, to enlarged scale.
Figure 3:
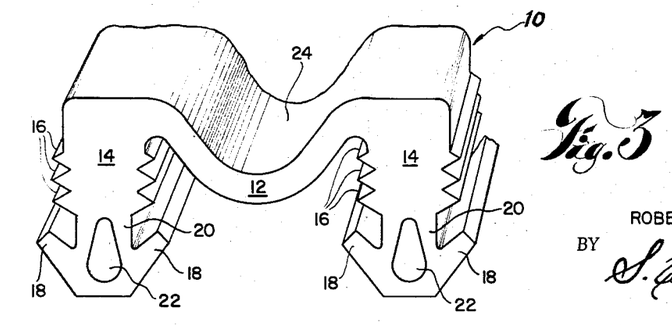
FIG. 3 is a fragmentary perspective view, in further enlargement, of the elastomeric joint securing and sealing element or strip employed in the joint structure of FIGS. 1 and 2.

In more detail, and referring to the appended drawings, and particularly FIGS. 1 to 3 inclusive, a joint securing and sealing member 10, of natural or synthetic rubber, or similar resilient and elastomeric plastic material, preferably exhibiting a durometer hardness in the range 60 to 75, is provided in the form of an elongate strip of substantially uniform transverse cross-section comprising a connecting web portion 12 having depending opposite similar marginal edge ribs or legs 14, preferably fabricated as an extrusion in indeterminate length.

The depending legs 14 are of generally rectangular body trace or outline providing a maximum transverse width of 1.3 to 3 times the maximum thickness of their integral connecting web 12. The similar depending ribs or legs 14 are also preferably serrated on their oppositely defining surfaces at 16, within the generally rectangular body trace or outline thereof, and terminate at their free ends, remote to their integral connection to the web 12, in head portions each comprising laterally opposite and preferably slightly angularly upwardly diverging or inclined flanges 18 in cross-sectional reduced web connection 20 to the body portion of each rib 14. An axially extending aperture 22, is also preferably incorporated in each head portion between the diverging flanges 18 thereof and preferably confined within and below the reduced web connection 20 thereof.

The web 12, as stated above, is preferably thinner in thickness than the maximum transverse width of the depending legs 14 and is also preferably undulating across its width, as at 24, between the aforesaid depending legs, to thereby increase the flexibility, extensibility and compressibility, and/or transformability, of the connecting web 12 in respect to differential change in the transverse distance across or between the depending legs 14.

The elastomeric joint securing and sealing element 10 of FIG. 3 is illustrated in its initially fabricated self-supporting form, prior to its intended and installed use in the joint structure or structures of FIGS. 1 and 2. Therein a pair of substantially similar sandwich type panel modules 26 is provided, each comprising a central core 28 of polystyrene, or similar foamed or expanded light weight polymeric insulating material, and each having a relatively thin metallic surface liner 30 suitably bonded, as by adhesive bonding, against the underlying coextensive opposite major contacting surface areas of the core 28.

Adjacent marginal edges of the liner sheets 30 (FIG. 2) extend laterally beyond the immediately underlying core material 28, as by rabbeting the core at 32, and are configured in profile to provide substantially similar pockets or recesses 34 inwardly directed below or away from the exposed surfaces of each of a pair of the marginally adjacent liner sheets 30 on the same exposed surface area of the adjacent panels 26. It will be observed that each pocket or recess 34 is re-entrant in transverse cross-section, is structurally formed to provide a narrow entrance throat 36, is outwardly and oppositely shouldered at 38, and terminates in a laterally widened re-entrant portion 40 remote to the plane of the exposed surface of the liners 30. It is also to be observed that a return outermost edge of each of the so configurated marginal edges of the liners 30 is foreshortened and preferably terminates in an outwardly directed marginal edge flare or chamfer 42.

Manifestly the precise configuration of the pocket or recess 34, provided at the overhanging marginal edge of each of the liner sheets 30 herein described, is subject to a variety of transverse cross-sectional configurations, the essential requirement being that each cavity or recess be of generally re-entrant cross-section and that it preferably lies below the outwardly directed or exposed surface of the liner 30 immediately adjacent and contiguous therewith.

Structural and coupled assembly of the module panels 26 and the elastomeric joint securing and sealing member 10, as in the erection of a building roof, deck, wall, truck body, or similar structure, is best illustrated in the sectional view of FIG. 2. Therein the panels 26 are rigidly secured against suitable conventional supporting or framing elements, such as the structural angles 44, as by blind rivets 46, the rigid connection in each instance preferably comprising securement of the exposed liners 30 on the same side of an adjacent pair of the panels 26. In this manner, the full thickness of each panel, including its attached core 28 and opposite liner 30, is free to expand and contract towards and away from the central axis bisecting the transverse width of the joint between the marginal configured edges of the module panels 26 in response to differential thermal conditions on opposite exposed major surface areas of the panels 26, with maximum relative movement of the panels taking place on the sides thereof remote to the rigid structure represented by the structural framing angles 44. In fact the only restraint to such relative movement transversely across the marginal joint between the module panels 26, other than the riveted or similar positive securement of the liners 30 to the rigid supporting elements 44, is imposed by the shear value of the core material 28 and the elastomeric resiliency and flexible transformability, in conjunction with the transverse cross-sectional configuration, of the web 12 of the joint securing and sealing element 10.

Manifestly, the relative movement across the joint of FIG. 2, explained above in regard to differential thermal exposure on opposite sides of installations incorporating the module panels 26 of the invention, can also a rise as a result of deflection of the panels under applied loading of structures incorporating the same.

In more specific consideration and explanation of the function and essential structural detail of the elastomeric joint securing and sealing element 10 of the invention, and referring again to FIG. 2, it will be observed that the depending legs 14 thereof are selected in such initial maximum transverse width to insure compressible deformation and transformation thereof across and between the opposite wall areas defining the entrance throat 36 to each of the configurated marginal re-entrant pockets 34 formed along the overhanging marginal edge areas of the liner sheets 30, to thereby tightly and substantially fill the throat entrances 36 of the liner pockets or recesses 34 of adjacent module panels 26. This entails substantial distortion and appreciable flattening of outstanding crests of the serrations 16 to provide compressibly generated and substantial lateral bearing contact between opposite sides of each of the depending legs 14 of the elastomeric element 10 and opposite side walls of the throats 36 coextensively receiving the same therebetween to thereby insure tightly sealed and leak-proof connection of the elastomeric element 10 within each of the recesses or pockets 34.

In addition, the flexibly carried and resiliently distortable terminal flanges 18 of the legs 14 are initially selected in their axial distance below the opposite serrated side walls thereof to insure finally installed disposition of the flanges 18 thereof in opposite lateral upward compressive contact against the laterally opposite shouldered ledges or surfaces 38 defining the lateral enlargement, or the re-entrant portion 40 of each of the pockets 34, receiving the depending legs 14 of the elastomeric element 10, to thus provide restriction against unintentional withdrawal of the depending legs 14 and securement of the joint structure so formed. This initially selected axial dimensional relationship and laterally outward and upward angularly directed disposition of the terminal flanges 18 preferably provides for slight additional lateral angular outward deflection thereof from their initial to final compressive disposition upwardly against the shoulders 38 in biasingly exerted pressure therebetween. The reduced cross-section 20, as well as the axially extending apertures 22, aid appreciably in this respect.

It will be now understood that the depending ribs or legs 14 of the elastomeric joint securing and sealing element 10 are forcibly introduced head first into the marginal re-entrant recesses or pockets 34 carried by, or integrally formed in, the extended marginal edges of the liner or facing sheets 30 in compressibly transformed joint sealing and joint securing restrained condition therewithin. It will also be appreciated that the reduced thickness connections 20 and axially extending apertures 22 permit inward resilient collapse of the head flanges 18 during entry of the depending ribs 14 into their respective re-entrant recesses 34.

In this regard, the foreshortened outer wall or leg of each of the marginal re-entrant recesses 34, receiving the compressively disposed and transformed depending legs 14 therewithin, is selected in axial length to insure appreciable axial tension in each of the depending legs 14 in restraining interlocking joint assembly of the elastomeric element 10 and adjacent module panels so connected, while the reduced thickness and undulating transverse cross-section of the resilient connecting web 12 permits of lateral movement transversely across the joints so made.

Figure 4:
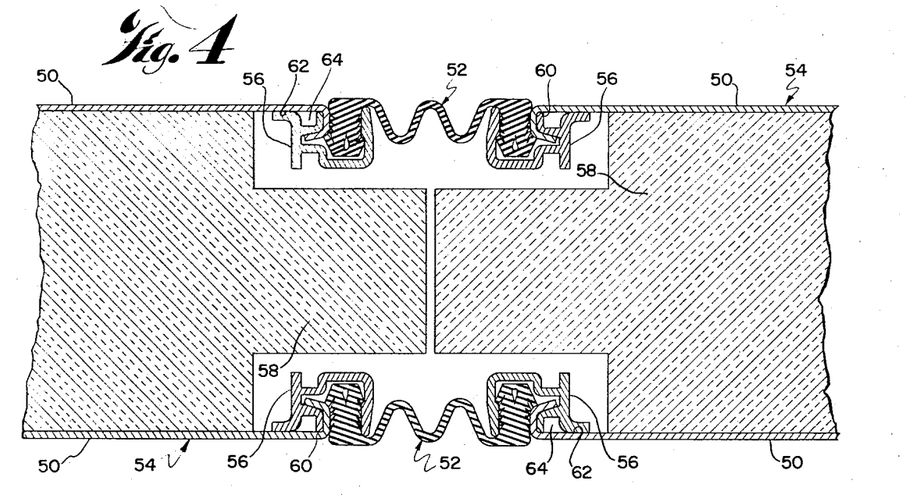
FIG. 4 is a fragmentary sectional elevation substantially similar to FIG. 2 but illustrating another embodiment of joint structure falling within the concept of the invention.
Figure 5:
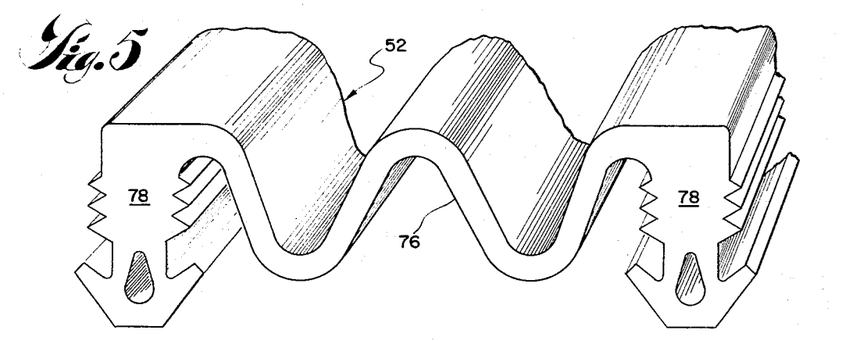
FIG. 5 is a fragmentary perspective view to enlarged scale of the elastomeric joint securing and sealing element or strip employed in the joint structure of FIG. 4.

The joint structure of FIG. 4 differs from that described above and illustrated in FIGS. 1, 2 and 3 only in the treatment of the adjacent marginal extended edges of the exposed surface of liner sheets 50 and the specific form of the web of the elastomeric joint securing and sealing element 52 (FIG. 5) incorporated in the joint structure of FIG. 4.

It will be observed in this regard that each marginally extending liner sheet 50 (FIG. 4) has been turned or bent downwardly and reversably on itself in respect to the plane of the exposed surfaces of adjacent module panels 54 of the same general sandwich type illustrated in FIGS. 1 and 2. In addition, individual substantially rigid similar reinforcing edging of batten strips 56, preferably and readily fabricated in the form of metallic extrusions, are provided for cooperative interengaging assembly with the configurated downwardly and reversely bent adjacent marginal edges of the liner sheets 50.

The edging strips 56, best illustrated to enlarged scale in FIG. 9, each define a generally channel-shaped element in transverse cross-section with upstanding flanges thereof directed toward the plane of the underside of the marginally extended liner or surface sheets 50 and have the web connecting the flanges disposed below or inwardly in respect to the underside of each sheet 50. More specifically, the upstanding flange of each edging strip 56, closest to the core 58 of each module panel 54 in the installation of FIG. 4, is preferably bifurcated to provide laterally spaced bearing surfaces 60 and 62 and an intervening open-top channel 64, to provide separated bearing surfaces 60 and 62 (FIG. 9) in supporting abutment against the underside of each marginally extended surfacing sheet 50, when the reversely struck or bent marginal edge 66 of each of the sheets 50 is received within a recess 68, formed in the wall or innermost flange of each edging strip 56 (FIG. 9) remote to the marginal space between the adjacent module panels 54. The presence of the channel 64 concentrates and increases the degree of bearing contact between the surfaces 60 and 62 and underside of the liner 50, as well as serving as a collector drain for interior condensation trapped therewithin.

The opposite upstanding flange of each edging or batten strip 56 is inwardly shouldered at 70, and in cooperation with the first-mentioned upstanding flange and the connecting web 72, completes an inwardly directed marginal re-entrant recess or pocket in much the same manner described above for the installation of FIGS. 1 and 2, with the reversely bent flange 66, projecting into the recess 68 combining with the substantially oppositely disposed shoulder 70 and providing the laterally widened or re-entrant recess remote to the underside of each of the facing or liner sheets 50. Interengaging assembly of the edging or batten strips 56 with the marginally configurated liner sheets of FIGS. 4 and 9, thus far referred to, can be obtained through relative axial sliding entry of the inturned flange 66 of the liner sheet within the recess 68 of the edging strip 56, particularly in the case of the edge rabbeted composite laminated module panels 54 of FIG. 4. The interengaged assembly can also be carried out between these two substantially rigid joint members before the edge configurated liner sheets have been compositely attached to their core materials.

The elastomeric joint securing and sealing element 52 (FIG. 5), incorporated in the joint embodiment illustrated in FIG. 4, is identical for all practical purposes to that of FIG. 3, except that it incorporates a reversely undulating connecting web 76 between the depending marginal legs or ribs 78 thereof to thereby increase the width or couple distance across the joint disclosed in FIG. 4 from that of FIG. 2. The increased chordal width or transverse length of the elastomeric element 52 in the embodiment of the invention illustrated in FIGS. 4 and 5 manifestly permits a greater range of relative movement between the coupled, joined and sealed module panels 54. The elastomeric joint securing and sealing element 52 is otherwise installed and functions in the same manners as its counterpart 10 (FIG. 3) in the joint structure of FIGS. 1 and 2.

Figure 6:
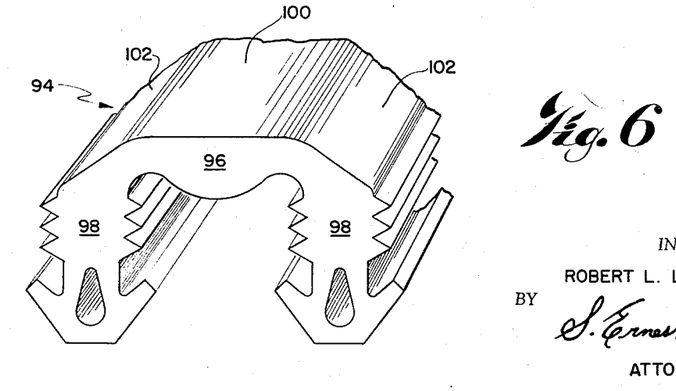
FIG. 6 is a fragmentary perspective view to enlarged scale of a further modified form of elastomeric joint securing and sealing element of the invention.
Figure 7:
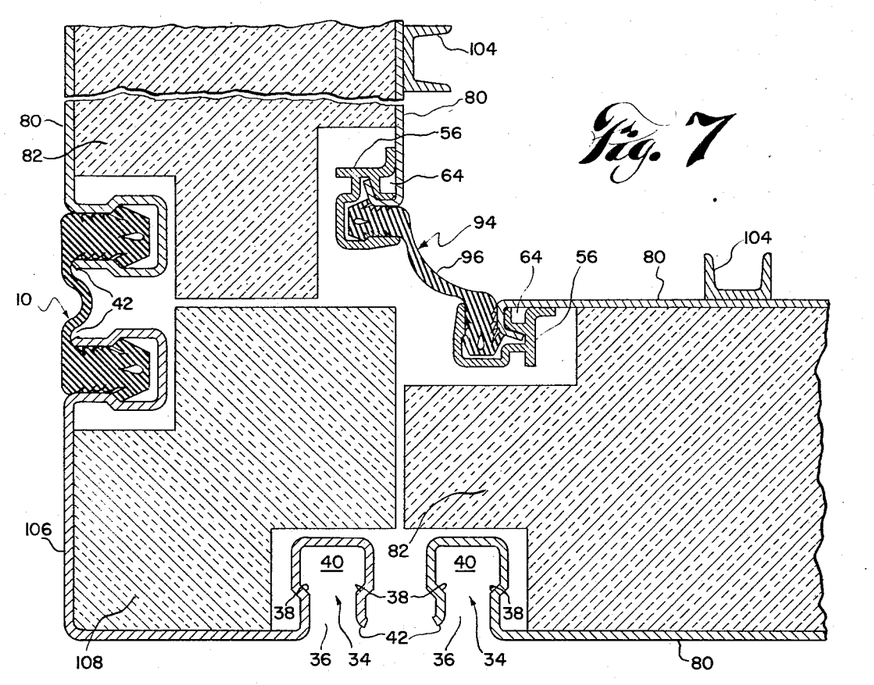
FIG. 7 is a fragmentary transverse sectional view through an inside corner joint falling within the concept of the invention and incorporating the elastomeric element of FIG. 6.

An assembled corner joint structure, and elements thereof, falling within the scope of the invention, are illustrated in FIGS. 6 and 7. Therein the identical edging strip 56, earlier identified herein in the joint structure of FIG. 4, have been employed in assembled interengaging relationship with the configurated marginally extending edges of substantially rigid interiorly directed surfacing sheets or liners 80 of sandwich type module panels 82. In this joint structure, the marginal edge treatment of each of the interior liners 80 is identical to that of the liners or surfacing sheets 50 in the joint of FIG. 4.

A slightly modified elastomeric joint securing and sealing element 94 (FIG. 7), however, is preferred in this interior corner joint installation in regard to the web 96 in integral connection with the oppositely depending similar legs 98 thereof (FIG. 6). It will be observed in this regard that the web 96 is initially defined on its exposed surface by a central flat surface 100 and opposite inclined lateral surfaces 102, as well as having its greatest thickness substantially centrally located. On the other hand, the depending legs or ribs 98 are of the same configuration as their counterparts of elastomeric elements 10 (FIG. 3) and 52 (FIG. 5) even to include the maximum transverse body width to maximum web thickness relationship of 1.3 to 3. Selection of this initial configuration of the web portion of the coupling member 94 (FIG. 6) has been found desirable in the finally assembled inside corner joint exemplified by FIG. 7, and has been productive of a substantially flat, or only slightly depressed, inwardly directed angularly disposed corner surface, devoid of dirt collecting grooving, which would not have resulted with the undulating webs of the coupling members 10 and 52, previously described and illustrated hereinabove. Insertion and final coupled installation of the elastomeric element 94 in the corner joint of FIG. 7 has responded in identical securing and sealing manner to that of the joints of FIGS. 2 and 4.

In the particular joint of FIG. 7, and this would be a preferable and critical desideratum in installations enclosing freezer chambers and the like, the interior facing sheet 80 of each of the panel modules 82 would be permanently secured to buck stays or channels 104 in a manner similar to that described for framing angles 44 in the joint construction of FIGS. 1 and 2, in that minimum relative change across the transverse width of the corner joint would be expected on the cold side of a so enclosed chamber. On the other hand, the outwardly exposed surfaces of the module panels 82 would be expected to be subjected to varying thermal conditions and would require the flexibility and adjustability provided by the elastomeric joint securing and sealing elements 10 (FIG. 3), or 52 (FIG. 5), in cooperative assembly with the configurated marginal edges of the outer liners 80 in the manner previously described for the joint structure of FIG. 2. However, the exterior joints could be replaced with the joint structure of FIG. 4.

It will be observed that an exterior corner plate or sheet 106 has been employed in the corner joint structure of FIG. 7 to complete the exterior contour of this installation. In this regard, a precut and profiled log or plank 108 of expanded polystyrene, or similar insulating material, coextensively adhered to the inner surfaces of the angularly bent sheet 106, has performed with complete satisfaction, the opposite marginal edges of the outer sheet 106 having been configurated to receive one marginal leg or rib of the elastomeric element 10 or 52, as required.

Figure 8:
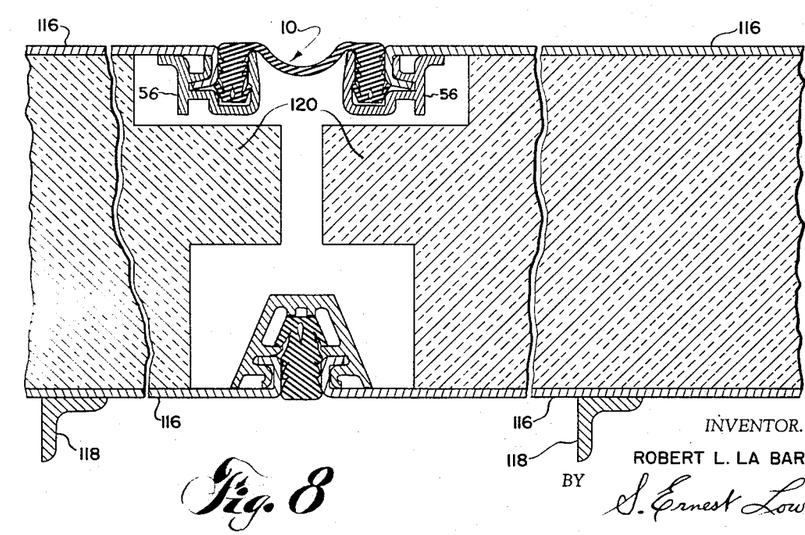
FIG. 8 is a fragmentary sectional elevational view substantially similar to FIGS. 2 and 4, but illustrating a further modified joint assembly of the invention.

FIG. 8 is illustrative of a module panel joint assembly particularly adapted to the construction of roofs, decks, and the like, where the upper exterior surface is exposed to the weather. In this installation, the upper exposed surface of the liners 116 of adjacent sandwich panels 120 of the general type hereinbefore described have been marginally configurated and elastomerically coupled in resiliently secured and sealed relationship following the procedure outlined above for the joining practice described in accordance with FIG. 4. The lower or interior liners 116 have been similarly marginally configurated for spliced interconnection in accordance with the joining practice described in my United States Letters Patent 3,232,395 granted Feb. 1, 1966, the substantially constant thermal conditions of the inner or underside of a roof or like structure not requiring the degree of flexibility and sealing resiliency characterizing the outer joint structure of FIG. 8, as hereinbefore explained. The inner or under side of the panels 120 would preferably be secured in supporting contact on stringers or supports 118 in the same manner as described for the structure of FIG. 2.

Figure 9:
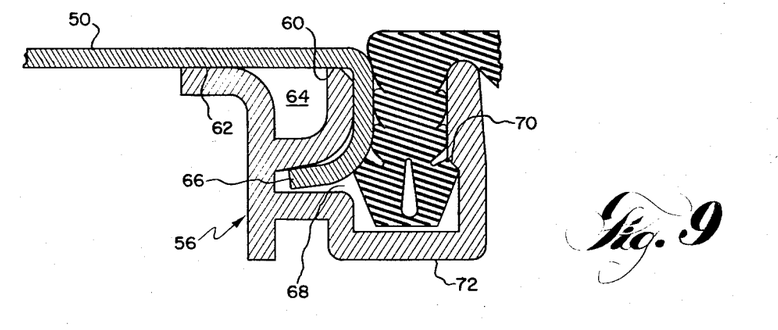
FIG. 9 is a fragmentary sectional view, to substantially the same scale as FIGS. 3, 5 and 6, of a portion of the joint structures incorporated in FIGS. 4 and 7.

The joint structure of FIG. 9 was previously described in terms of the joint construction first illustrated in FIG. 4. It is sufficient to further state, however, that the fragmentary joint structure of this particular illustration (FIG. 9) reveals the application and interchangeability of the elastomeric joint securing and sealing elements 10, 52 and 94 in all embodiments of the joint structures of the invention heretofore described and illustrated herein in their adaptability to one or both major surface areas of the substantially rigid, marginally configurated edges of adjacent sheathing and/or liner sheets, regardless of the presence or absence of expanding core material therebetween.

Figure 10:
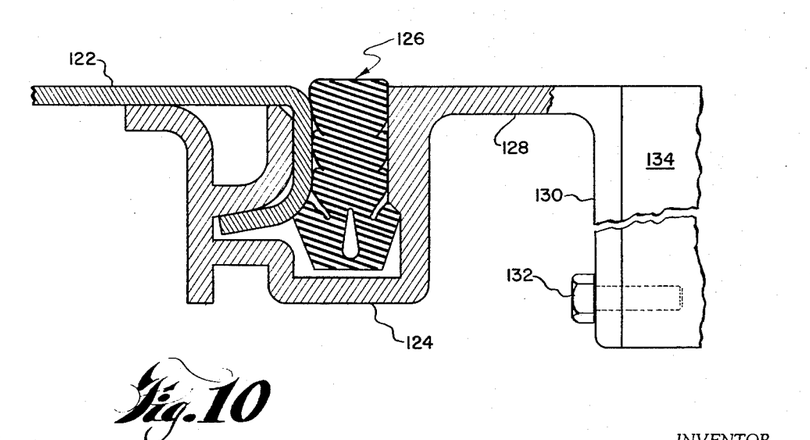
FIG. 10 is a fragmentary sectional view of an additional joint structure satisfying the invention.

FIG. 10 is illustrative of a joint structure between the marginal configurated edge of a substantially rigid sheet member 122 in interengaging assembly with a second substantially rigid member 124 in identically the same manner as previously described for the joint structures of FIGS. 4 and 9.

The elastomeric joint securing and sealing element 126 employed in the joint structure of FIG. 10, however, is confined to any one of the identical depending ribs or legs 14, 78 and 98 of the elastomeric elements 10, 52 and 94, respectively, and does not require the connecting web between two such identical ribs or legs in completion of the joint structure between the interengaging substantially rigid joint-forming members 122 and 124 to insure resilient securement and sealed relationship therebetween.

The integrally extending web 128 and angularly depending flange 130, illustrated in the joint structure of FIG. 10, are representative of structure permitting rigid attachment of member 124, as by the bolts 132, to a permanent member 134. It will be further observed that the joint structure of FIG. 10, in its entirety, is representative of jointure between a fixed or permanent post member, the member 134, and a substantially rigid sheet member 122, in interengaging assembly with an intermediate substantially rigid and secured joining member 124, in which the elastomeric element 126 compressively and transformably secures and seals the joint connection between the two substantially rigid interengaged joining members 122 and 124, in which case the elastomeric element 126 has performed in the identical same manner and in identical structural environment as previously illustrated and described for each of the depending ribs or legs 78 and 98 of elastomeric joint securing and sealing elements 52 and 94, respectively.

Bulk insulation is recommended and is preferably employed within any of the open spaces adjacent the joint structures of FIGS. 2, 4, 7 and 8 within the thickness of the laminated module panels thereof. Loose bulk insulation, such as pre-expanded flowable polystyrene beads and similar flowable organic insulating materials, have been found suitable for this purpose.

The hereinabove particularly described similar transverse configuration of the depending ribs or legs 14, 78 and 98 of the elastomeric joint securing and sealing elements 10, 52 and 94, respectively, which configuration is also characteristic of the elastomeric element 126 of the joint structure of FIG. 10, permits of interchangeability of the elastomeric joining elements of the invention in joint structures between substantially rigid members accounting for the re-entrant recess feature of the invention. The similarly configurated diverging flange head portions of the aforesaid elastomeric joint securing and sealing elements, in combination with their reduced connection and axially apertured area adjacent thereto, as best described above in conjunction with FIG. 3, besides permitting and aiding inward collapse of the diverging flanges on introduction or insertion head first into the outwardly open re-entrant recesses characterizing the joint structures of the invention, also permit reversibility of the lateral flanges in non-destructive intentional withdrawal of the elastomeric joint securing and sealing elements. This feature is an advantageous attribute of the joint structures and cooperating elastomeric components of the invention in that panels and similar building components, so connected in accordance with the invention, can be dismantled for replacement and/or removal thereof in entirety, and/or replacement of components thereof, as when they may be desired.

Having illustrated and described specific embodiments of joint structures and components thereof essential to a basic understanding of the practice of the invention, it will be understood that variations and further modifications from the specific embodiments hereinabove described and illustrated will be understood as falling within the scope of the invention, except as excluded by the following appended claims.

What is claimed is:

1. A resiliently compressible and transformable elastomeric joint sealing and securing element in elongate strip form adapted for incorporation in a joint structure between at least two substantially rigid structural members, the joint structure having a re-entrant recess for receiving the elastomeric element and configured to provide an outwardly open narrow entrance throat shouldered to provide a subtending widened recess therebelow; said elastomeric element having a body portion of generally rectangular transverse cross-section of maximum transverse width in excess to the maximum transverse width of the entrance throat to the reentrant recess, a subtending terminal head portion axially connected to said body portion by a reduced thickness web section, said terminal head portion having opposite laterally disposed flanges diverging outwardly beyond and upwardly towards to body portion of the elastomeric element; said elastomeric element being adapted for and responding to terminal head first introduction through the entrance throat of the re-entrant recess of the joint structure to cause inward collapse of the upwardly diverging terminal head flanges thereof towards the reduced thickness axial connecting web section to the body portion during their passage through the entrance throat, and said elastomeric element in its adapted final disposition within the re-entrant recess establishing compressive sealing relationship of opposite lateral surfaces of its body portion against opposite walls of the entrance throat, coextensive therewith, with the terminal head upwardly diverging flanges laterally outwardly disposed in distorted compressive securing relationship within the widened recess subtending the throat entrance to the re-entrant recess.

2. A resiliently compressible and transformable elastomeric joint sealing and securing element in elongate strip form adapted for incorporation in a joint structure between at least two substantially rigid structural members, the joint structure being characterized by a re-entrant recess for receiving the elastomeric element and configured to provide an outwardly open entrance throat oppositely shouldered to provide a subtending laterally widened recess therebelow; said elastomeric element having a body portion of generally rectangular cross-section of maximum transverse width in excess to the maximum transverse width of the entrance throat to the re-entrant recess, a subtending terminal head portion having opposite laterally disposed flanges diverging oppositely outwardly beyond and upwardly towards the body portion, a reduced thickness web connecting the body and terminal head portions; said elastomeric element being adapted for and responding to terminal head first introduction through the entrance throat of the re-entrant recess of the joint structure to cause inward collapse of the upwardly diverging head flanges thereof towards the reduced thickness connecting web to the body portion during their passage through the entrance throat, and said elastomeric element in its final disposition within the re-entrant recess establishing compressive sealing relationship of opposite lateral surfaces of its body portion against opposite walls of the entrance throat co-extensive therewith, with the terminal head upwardly diverging flanges laterally outwardly disposed in distorted compressive securing relationship within the laterally widened recess subtending the throat entrance to the re-entrant recess.

3. The elastomeric joint sealing and securing element of claim 2 in which the opposite surfaces of the body portion thereof are serrated.

4. A resiliently compressible and transformable elastomeric joint sealing and securing element in elongate strip form adapted for incorporation in a joint structure between at least two substantially rigid structural members characterized and configured to provide a pair of spaced reentrant recesses, each re-entrant recess having an outwardly open narrow entrance throat oppositely shouldered to provide a subtending laterally widened recess therebelow; said elastomeric element having a web section and an angularly depending opposite marginal edge rib of generally rectangular transverse cross-section of maximum transverse width in excess to the maximum transverse width of the entrance throat to each re-entrant recess of the joint structure, each rib having a subtending terminal head portion axially connected thereto by a reduced thickness web section, each terminal head portion having laterally oppositely disposed flanges diverging upwardly towards and outwardly beyond the maximum transverse width of each rib, said web section connecting the marginally disposed ribs having a maximum thickness less than the maximum transverse width of each rib; said elastomeric element being adapted for and responding to terminal head first introduction of one each of the ribs thereof through each entrance throat of one each of the spaced re-entrant recesses of the joint structure to cause inward collapse of the upwardly diverging terminal head flanges of each of the ribs inwardly towards the reduced thickness axial connecting web section during passage of the head flanges through each entrance throat, and said elastomeric element in its adapted final disposition of a rib thereof within one each of the re-entrant recesses of the joint structure establishing compressive sealing relationship of opposite lateral surfaces of each of the ribs against opposite walls of one each entrance throat, adjacent thereto, with the terminal head upwardly diverging flanges thereof returned outwardly in distorted compressive securing relationship within the laterally widened recess subtending each entrance throat to each of the reentrant recesses of the joint structure.

5. The elastomeric joint sealing and securing element of claim 4 in which the opposite lateral surfaces of each rib thereof are serrated and the maximum transverse width of each marginal rib is 1.3 to 3 times that of the maximum thickness of the web section connecting the same.

6. A resiliently secured and sealed joint structure between two substantially rigid structural members capable of relative movement in interengaging assembly thereof and combining to form an outwardly open re-entrant recess having opposite walls defining a narrow throat entrance subtended by oppositely outwardly disposed shoulder surfaces defining lateral enlargement of the recess below and substantially contiguous with said throat entrance, one of the opposite walls of said throat entrance and shoulder surface contiguous therewith comprising one said structural member in interengagement with the other said structural member, and the opposite throat entrance wall and shoulder surface contiguous therewith confined to the other structural member; a resiliently compressible elastomeric joint securing and sealing element inserted through the throat entrance and extending into the laterally enlarged recess below the shoulder surfaces thereof, said elastomeric element having a body portion of generally rectangular trace of greater maximum transverse width than the maximum transverse width of the throat entrance, a subtending terminal head portion integrally and axially connected to the body portion of said elastomeric joint securing and sealing element by an elongate connecting web portion reduced in transverse width from that of the body portion thereof, said terminal head portion comprising opposite lateral flanges diverging outwardly beyond and upwardly towards said interconnected body portion of the elastomeric joint securing and sealing element, said elastomeric element on insertion head first through the throat entrance causing resilient inward collapse of the diverging flanges toward the elongate reduced width connecting web portion thereof into said laterally enlarged recess below the throat entrance to the re-entrant recess in substantially outwardly diverging returned compressively distorted condition of the flanges in resiliently restraining and securing abutment thereof against one each of the oppositely disposed shoulder surfaces, with compressed sealing relationship of the body portion of the elastomeric element against opposite walls of the throat entrance.

7. A flexible joint structure between spaced marginal edges of adjacent substantially rigid structural members capable of relative movement, each marginal edge incorporating an outwardly open re-entrant recess having opposite lateral walls defining a narrow throat entrance subtended by oppositely disposed shoulder surfaces defining lateral enlargement of the recess below the throat entrance contiguous therewith, a unitary resiliently compressible and extensible elastomeric joint coupling element comprising a web section and opposite marginally depending ribs, said ribs each being of greater maximum transverse width than the transverse width across the narrow throat entrance to each recess and each depending rib also having a free terminal end in the form of opposite laterally disposed angularly inclined flanges diverging outwardly beyond and towards the rib, the free terminal end in each instance being connected to its rib by an elongate connecting web section of reduced transverse width, one each of said depending ribs being disposed within one each of the re-entrant recesses in compressibly distorted sealing contact against the opposite walls defining the narrow throat entrance thereto and having the free terminal end flanges thereof disposed within the lateral enlargement in diverging restrainedly laterally outwardly and upwardly disposition against the oppositely disposed shoulder surfaces defining the lateral enlargement of each recess below the entrance thereto, and said web section of the elastomeric joint coupling element permitting relative movement between the adjacent marginal edge re-entrant recesses and the restrainedly secured and sealed ribs therewithin.

8. The flexible joint structure of claim 7 in which the first-mentioned web section of the elastomeric coupling element is undulating in transverse profile between the depending ribs thereof, and the maximum transverse width of each depending rib is 1.3 to 3 times the maximum thickness of the aforesaid first-mentioned web section.

9. A flexible joint structure between marginally separated edges of adjacent substantially rigid structural sheet members, the adjacent marginal separated edges being each configurated to provide an outwardly open reversely bent marginal edge channel with the entrance thereto and free terminal leg thereof in opposing relationship, a pair of generally channel-shaped substatially rigid interchangeable edging strips each having upstanding flanges and an interconnecting web, one said upstanding flange of each edging strip being laterally recessed to receive the free terminal leg of one each of the marginally reversely bent sheet members with the said recessed flange otherwise in bearing contact against the underside of each sheet member in cooperative disposition thereto, the remaining upstanding flange of each edging strip being disposed within the space between the marginally separated sheet members in spaced relationship therewithin and providing with each sheet member an open top re-entrant recess directed below the plane of the exposed surface of each sheet member, each of said so formed open top re-entrant recesses providing an axially narrow throat entrance subtended by a lateral enlargement thereof separated by substantially oppositely disposed shoulder surfaces, a resiliently compressible and transformable unitary elastomeric joint sealing and coupling element in strip form comprising a web section and opposite marginal depending ribs, said ribs each being of greater maximum transverse width than the transverse width across the narrow throat entrance to each reentrant recess and each having a free terminal end in the form of opposite laterally disposed angularly inclined flanges in diverging relationship outwardly beyond and toward each rib of the coupling member, a reduced thickness elongate web connection between each rib and its free terminal end diverging flanges, one each of said depending ribs being disposed within one each of the re-entrant recesses in compressibly distorted substantially coextensive sealing contact against the opposite walls defining the axially narrow throat entrance thereto and having the free terminal end flanges thereof diverging restrainedly laterally outwardly and upwardly in compressive relationship against the substantially oppositely disposed shoulder surfaces defining the lateral enlargement of each re-entrant recess below the entrance thereto, and said first-mentioned web section of the elastomeric joint coupling element permitting relative movement between the adjacent marginal edge re-entrant recesses of the joint structure and the restrained depending ribs securingly cooperating therewith.

10. A flexible joint structure between marginal edges of adjacently spaced module panel members, each module panel member comprising an organic light weight polymeric core having at least one major surface thereof provided with a secured coextensive substantially rigid liner sheet with the liner sheet extending beyond the underlying core immediately below the same in adjacent marginally disposed arrangement of the module panel members, said extending liner sheet of each adjacent module panel membr being configurated to provide an open reversely bent marginal edge channel with the entrance thereto and free terminal leg thereof directed toward the core thereof, a pair of generally channel-shaped interchangeable substantially rigid edging strips each having upstanding flanges and an interconnecting web, one said upstanding flange of each edging strip being laterally recessed to receive the free terminal leg of the configurated marginal edge of one each of the extending liner sheets with the said recessed flange otherwise in bearing contact against the underside of the extending liner sheet in cooperative disposition thereto, the remaining upstanding flange of each edging strip being disposed within the space between the module panel members in spaced relationship and providing with each of the extending liner sheets associated therewith an open top re-entrant recess directed below the plane of the exposed surface of each extending liner sheet, each of said so formed open top re-entrant recesses providing an axially narrow throat entrance substended by a lateral enlargement thereof separated by substantially oppositely disposed shoulder surfaces, a unitary resiliently compressible and transformable elastomeric joint coupling and securing element in elongate strip form comprising a web section and an opposite marginally supported rib, said ribs each being of greater maximum transverse width than the transverse width across the narrow throat entrance to each re-entrant recess and each having a free terminal end in the form of opposite laterally disposed angularly inclined flanges in diverging relationship outwardly beyond and toward each marginal rib of the coupling member, a reduced thickness elongate web section connecting each terminal end to one each of the ribs, each of the said depending ribs being disposed within one each of the re-entrant recesses in compressibly distorted coextensive sealing contact against the opposite walls defining the axially narrow throat entrance thereto and having the free terminal end flanges thereof diverging restrainedly laterally outwardly and upwardly in compressive relationship against the substantially oppositely disposed shoulder surfaces defining the lateral enlargement of each re-entrant recess below the entrance thereto, and said first-mentioned web section of the elastomeric joint coupling element permitting relative movement between the adjacent marginal edge re-entrant recesses, extending liner sheets, and the restrained depending ribs securingly cooperating therewith.

11. The flexible joint structure in accordance with claim 10 in which the first-mentioned web section of the elastomeric coupling element is undulating in transverse profile between the depending ribs thereof, the maximum transverse width of each depending rib is 1.3 to 3 times the maximum thickness of the aforesaid first-mentioned web section, and the free terminal end of each rib is axially apertured within the depth of the elongate reduced thickness connecting web section thereof.

References Cited

UNITED STATES PATENTS

| | | | |
|---|---|---|---|
| 2,230,688 | 2/1941 | Irwin | 52—288 |
| 2,377,702 | 6/1945 | Lindsay | 52—463 |
| 2,394,443 | 2/1946 | Guignon | 52—584 |
| 2,627,949 | 2/1953 | Willson | 52—403 |
| 2,710,081 | 6/1955 | Fink | 287—189.36 |
| 2,872,713 | 2/1959 | Haas | 52—398 |
| 2,877,515 | 3/1959 | Haas | 52—403 |
| 2,962,133 | 11/1960 | Kivett | 52—584 |
| 2,963,825 | 12/1960 | Douglas | 52—584 |
| 3,024,881 | 3/1962 | Haas | 52—398 |
| 3,143,165 | 8/1964 | Lewis | 52—396 |
| 3,203,053 | 8/1965 | Lane | 52—398 |
| 3,232,395 | 2/1966 | LaBarge | 52—395 |

FOREIGN PATENTS

| | | |
|---|---|---|
| 228,144 | 1960 | Australia. |
| 1,260,252 | 1961 | France. |
| 748,436 | 1956 | Great Britain. |
| 804,758 | 1957 | Great Britain. |
| 914,177 | 1962 | Great Britain. |
| 567,364 | 1957 | Italy. |

HENRY C. SUTHERLAND, *Primary Examiner.*

R. A. STENZEL, *Assistant Examiner.*